(12) United States Patent
Sawada et al.

(10) Patent No.: US 6,724,935 B1
(45) Date of Patent: Apr. 20, 2004

(54) COLOR IMAGE PROCESSING APPARATUS FOR PERFORMING COLOR ADJUSTMENT AND COLOR CONVERSION PROCESSING

(75) Inventors: Takayuki Sawada, Tokyo (JP); Hiroki Kanno, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 629 days.

(21) Appl. No.: 09/641,339

(22) Filed: Aug. 18, 2000

(30) Foreign Application Priority Data

Aug. 20, 1999 (JP) .......................................... 11-234085

(51) Int. Cl.$^7$ ................................................. G06K 9/00
(52) U.S. Cl. ...................................... 382/167; 358/518
(58) Field of Search ................................. 382/162–167; 358/504–540

(56) References Cited

U.S. PATENT DOCUMENTS

| | | | |
|---|---|---|---|
| 4,963,925 A | | 10/1990 | Miyazaki ...................... 355/77 |
| 5,339,176 A | * | 8/1994 | Smilansky et al. .......... 358/518 |
| 5,481,380 A | * | 1/1996 | Bestmann ................... 358/518 |
| 5,760,913 A | * | 6/1998 | Falk ............................ 358/518 |
| 5,881,211 A | * | 3/1999 | Matsumura ................. 358/518 |
| 6,278,533 B1 | * | 8/2001 | Takemoto ................... 382/167 |
| 6,373,980 B2 | * | 4/2002 | Ohta ........................... 382/167 |

FOREIGN PATENT DOCUMENTS

JP 6-57047 7/1994

* cited by examiner

*Primary Examiner*—Jingge Wu
(74) *Attorney, Agent, or Firm*—Foley & Lardner (57) ABSTRACT

By using the memory which stores the first lattice point color coordinates data equivalent to the lattice point address of the color conversion LUT data which is referred to at the time of color conversion processing, the color adjustment parameter composition section which composes the color adjustment parameter in accordance with the instruction information of the input color adjustments, and the color adjustment section which outputs the second lattice point coordinates data by conducting color adjustment on the first lattice point color coordinates stored in the memory by using this color adjustment parameter, and after converting the second lattice point color coordinates data to the second lattice point color coordinates data expressed in the second color space, conduct conversion processing on the input image data expressed in the first/color space in accordance with the color conversion LUT data which is renewed by this. It is a color image processing apparatus that possesses at least a color conversion section which outputs the output image data expressed in the second color space. By doing so, color conversion processing only for the color adjustment processing becomes unnecessary. Thus, it is possible to provide an image processing apparatus that can conduct color conversion processing with rapid color adjustment.

15 Claims, 4 Drawing Sheets

COLOR IMAGE PROCESSING APPARATUS FOR PERFORMING COLOR ADJUSTMENT AND COLOR CONVERSION PROCESSING

CROSS-REFERENCE TO RELATED APPLICATIONS

This application is based upon and claims the benefit of priority from the prior Japanese Patent Application No. 11-234085, filed Aug. 20, 1999, the entire contents of which are incorporated herein by reference.

BACKGROUND OF THE INVENTION

The present invention relates to a color image processing apparatus applicable to an image forming apparatus that reproduces an object image onto a copying material by using an electrostatic photography process.

Color adjustment in color copiers is a process used for corrections in case the output image does not exactly reproduce the color of the input image (manuscript) or in case color that is different from the input image is intentionally output.

As color adjustment method which have been disclosed up to now, the image data are converted into coordinate data of three attributes that represent the three attributes of color, namely, hue (H), luminosity (L), and chroma (saturation) (C), and after making adjustments by increasing or decreasing the respective attributes on the coordinates of the three attributes, the process is generally returned to the original color space (additive mixtures of three colors based on red, green, and blue, in other words, the three primary colors of colored light) or CMY (subtractive color mixtures based on cyan, magenta, and yellow, in other words, the three primary colors of coloring materials).

However, it is known that by this method, the processing time required to convert the coordinates of the three attributes is very long. Thus, a conversion method in which color space (HSV, etc.) with high correlation to the three attributes can be made with rather simple operation from RGB color space has been contrived. However, the accuracy of the correlation between the HSV color space and the three attributes is not necessarily sufficient.

Apart from this, in the case of color copiers, at the time of color conversion process where the input image data expressed by color space of three primary colors of colored light (RGB) is converted into color space of three primary coloring materials (CMY) and reproduced on the recording media, as means to obtain the parameters of the color conversion, the method in which sample color patches (color sample images) output by the apparatus (copier) itself is read in, and a plurality of colors for the RGB-CMY data group patches are collected, then the coefficients of the conversion polynomials from RGB to CMY are obtained by the least square method is well known.

However, in this operation, at the time the color patches are read in, mechanical accuracy becomes necessary. Furthermore, in order to obtain color conversion parameter with high accuracy, it is desirable to use multi-color color patches. On the other hand, in order to output multi-color patches to a form of specified area, the individual patch sizes must be made small, and contradictory conditions co-exist.

Above case suggests that an even stricter mechanical accuracy is demanded from the patch read-in to the data extraction. For instance, in case priority is given to the accuracy, it becomes necessary to allow ample time for obtaining the color conversion parameters. On the other hand, in order to reduce the processing time, for instance, if the number of color patches is reduced, there is the problem of lowering the color conversion accuracy.

BRIEF SUMMARY OF THE INVENTION

The present invention aims to provide an image processing apparatus which is applicable to color copiers, and which can conduct color adjustment and color conversion at high speed, high accuracy, and low cost.

The present invention provides a color image processing apparatus which executes color conversion processing on an input image data expressed in first color space, and outputs an output image data expressed in second color space, comprising LUT means for storing color conversion LUT data that is referred to at the time of color conversion processing; storing means for storing a first lattice point color coordinates data equivalent to lattice point address of the color conversion LUT data; color tone instruction means for inputting instruction information instructing color tone changes that have been set beforehand in accordance with a specified conditions; color adjustment parameter composition means for composing color adjustment parameters in accordance with the instruction information input from the color tone instruction means; color adjusting means for color adjusting the first lattice point color coordinates data stored in the storage means with the color adjustment parameter composed by the color adjustment parameters composition means, so as to output a second lattice point color coordinates data; unadjusted color conversion means for converting the second lattice point color coordinates data output from the color adjustment means into the second lattice point color coordinates data expressed in the second color space; color conversion LUT renewal means for renewing the color conversion LUT data stored by the LUT means in accordance with the second lattice point color coordinates data converted by the unadjusted color conversion means; and color conversion means for converting the input image data expressed in the first color space to the output image data expressed in the second color space in accordance with the color conversion LUT data renewed by the color conversion LUT renewal means.

The present invention relates to the First Embodiment, and in order to reflect the color adjustment processing to the color conversion LUT parameters used at the time of color conversion processing, it rewrites the color conversion LUT parameters. By doing so, rapid and high accuracy color adjustment processing and color conversion processing can be conducted without causing non-conformities such as spending long processing time by repeating color conversion processing for color adjustment processing as in the past.

Furthermore, the present invention relates to Second and Third Embodiments, and it is a color image processing apparatus which possesses the complementary color conversion means that outputs image data after the correction expressed in the first color space by conducting complementary color conversion on the input image data expressed in the first color space, and the basic color conversion means that outputs the output image data expressed in the second color space by conducting basic color conversion on the image data after the correction expressed in the first color space output by the complementary color conversion means, and which conducts conversion processing on the input image data expressed in the first color space, and outputs the output image data expressed in the second color space.

The present invention makes it possible to conduct high accuracy color conversion by using higher order polynomial approximation in the case of basic color conversion, and fine color adjustments through complementary color conversion and difference color conversion by conducting color conversion processing of at least two stages, that is, basic color conversion and complementary color conversion (and difference color conversion).

By doing so, for instance, it is possible to conduct the generation of basic color conversion parameters at the time shipment is made from the factory, and execute the complementary color conversion parameters and difference color conversion parameters after actual operation with the purpose of absorbing the changes which occur with the elapse of time or absorbing the changes which occur among individual apparatuses. By performing this, a color adjustment which enables the apparatus to absorb the individual differences as well as the changes which occur with the elapse of time, can be made, and a color image processing apparatus that allows stable color adjustment over a long period of time can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter a detailed description is given on the image processing apparatus which is an Embodiment of the present invention by using drawings.

<<First Embodiment>>

Figure 1:
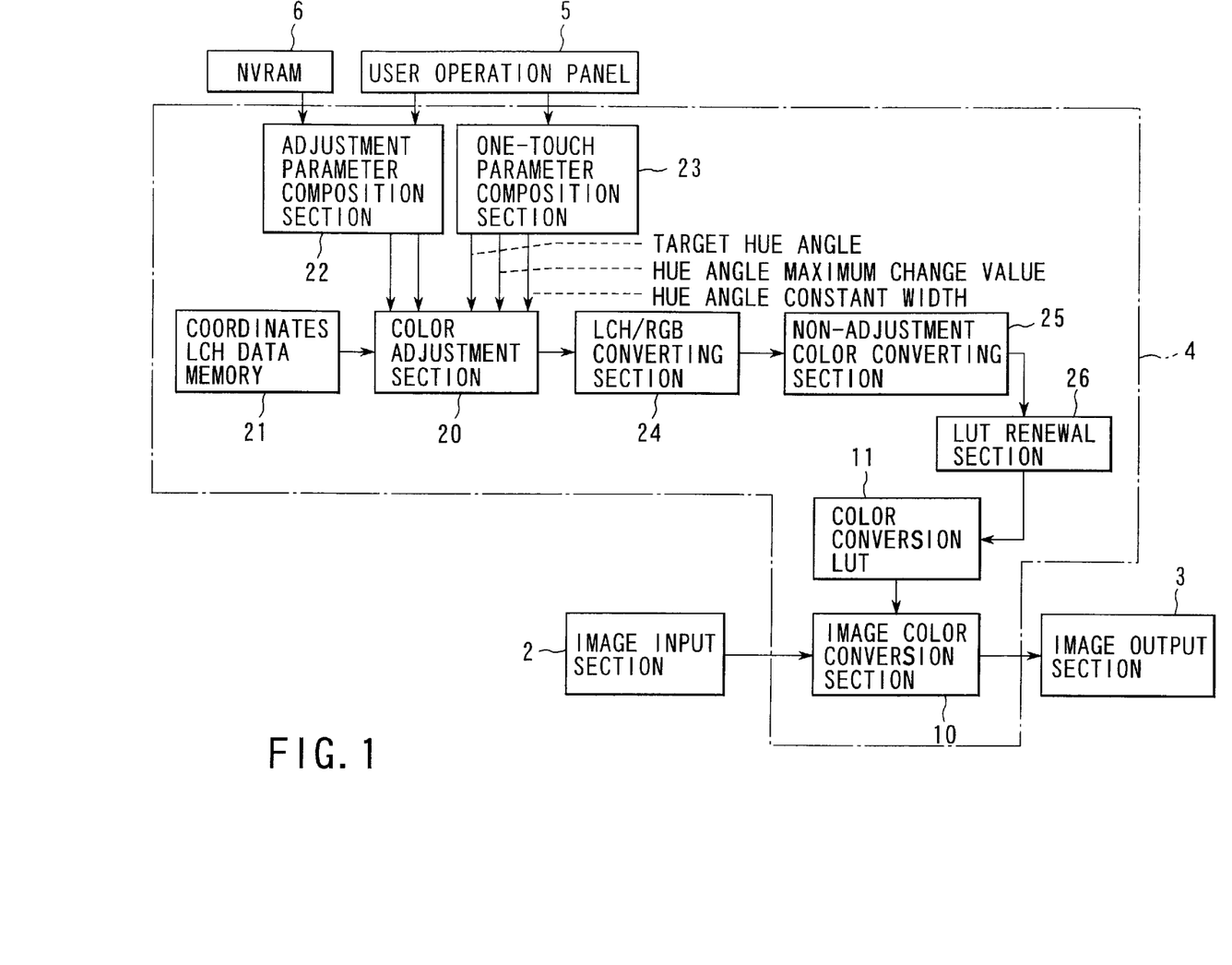
FIG. 1 is a schematic block diagram explaining the image processing apparatus of First Embodiment related to the present invention.

First Embodiment provides a fast and accurate image processing apparatus that will not increase the processing time for color adjustment since there is no need to repeat the color conversion processing several times when conducting color adjustment as in the conventional apparatuses by reflecting the results of the color adjustment in the contents of the color conversion LUT used for the color conversion processing. FIG. 1 is a schematic block diagram showing the image processing apparatus that is First Embodiment.

As shown in FIG. 1, the image processing apparatus 1 of First Embodiment, is installed between the image input section 2 where image signals from the unillustrated image reading apparatus (scanner, etc.) are input, and the image output section 3 where image signals (for printers) are output towards the unillustrated image forming apparatus (printer, etc.), and the image processing apparatus comprises the image processing section 4 that can change the color reproduction between the image signals input into the image input section 2, and the output image at the time the input image (manuscript) is output to the image output section 3, as well as the user operating panel 5 which enables the users to input the changes, for instance, the hue, and further, the non-volatile memory 6.

In case the output image does not correctly reproduce the color of the input image at the time the input image provided from image input section 2 is separated into three primary colors of the colored light (RGB=R: Red, G; Green and B: Blue) as input image, and converted into three primary colors of the coloring materials (CMY=C: Cyan, M: Magenta, Y: Yellow) utilized in image formation in the printer apparatus or color copier apparatus connected to the image output section 3, as required, that is, for corrections in case the output image does not reproduce the colors of the input image correctly, or in case one wishes to change the output of the color intentionally against the input image, the image processing section 4 makes possible the color adjustments described below for corrections, and the image signal input from image input section 2 includes the image color conversion section 10 which converts the color based on the adjustment amount explained below, and the color adjustment section 20 that sets the adjusting amount of the color conversion that should be made by the color converting image color converting section 10.

To the color adjustment section 20, the lattice point LCH data memory 21 which memorizes the respective data of the three attributes of color equivalent to the lattice point address of the look up table (hereinafter referred to as LUT) 11 connected to the pre-stage of the image color conversion section 10, namely, the luminosity (L), the chroma (C) and the hue (H) for all lattice points. For instance based on the adjustment parameter input from the user operating panel 5 and the adjustment parameter stored in the non-volatile memory (NVRAM) 6, the adjustment parameter composite section 22 which composes composite adjustment parameters, and specified color tones, for instance, in correspondence with corrections which are directed towards color tones by sensibility terms such as "warm" or "cold", a one-touch adjustment parameter generating section 23 which outputs parameters utilized for special color adjustment that is pre-set is connected. Furthermore, in the case of one-touch adjustment, for instance, "warm" is an input instruction method for outputting color tones of the warm color group, and, for instance, "cold" is an input instruction method of outputting color tones of the cold color group. The color-adjustment instructions that are actually input at this time is, for example, increasing or decreasing the chroma (C) or turning the hue angle.

Between the color adjustment section 20 and the image color conversion section 10, connections are made in order with the respective data of LCH (three attributes) held in the lattice point LCH data memory 21, the RGB conversion section 24 which converts the adjustment amounts (adjusted lattice point data) which have been output after color adjustments by the composite adjustment parameter provided from the adjustment parameter composite section 22, and the parameter provided from the one-touch adjustment parameter composition section 23, into the RGB that is the same color space as the input image data, and the non-adjustment color conversion section (CMY conversion section) 25 which coverts the RGB data which has been output from the RGB conversion section 24 into CMY which is the same color space as the output image data, and the LUT renewal section 26 which rewrites the data of color conversion LUT 11, a pre-stage of the image color conversion section 10.

Next, an explanation is given on an example of processing in image processing apparatus 1 of the First Embodiment.

In an unillustrated image forming apparatus such as a color copier, the image which is formed on the recording media (paper sheet) where the final image is output, is normally obtained by aligning (laminating) toners (visualizing agent) comprising color or pigment, charge control agent, and resin materials, at the specified ratio by the electrostatic photocopying process. Thus, the color space demanded at the image output section 3 consists of three primary colors of the coloring materials (CMY).

Contrary to this, most of the input images consist of the three primary colors of colored light (RGB), and as we have already explained, in the image processing section 4 lying between the image output section 3 and the image input section 1, conversion of color space from RGB to CMY is conducted. However, in the conversion from RGB to CMY, a contradictory problem existed, and if you wished to raise the accuracy, the processing time increased, and if you wished to shorten the processing time, the accuracy would be lowered. Thus, in the present invention, as shown in FIG. 1, in the process for converting input image data from RGB to CMY, it shall be based on color conversion LUT 11, and in the setting of adjustment amount of the color adjustment to specify it, this shall be done independently by color adjustment section 20.

As for details, in the color adjustment section 20, by using the respective adjustment parameter 1, c, and h of L, C, and H given from the adjustment parameter composite section 22 and the one-touch adjustment parameter section 23 against LCH data of all coordinates stored beforehand in the coordinates LCH data memory 21, for instance, from the conversion equations expressed by $L'=L+1$ $C'=C \times c$, and $H'=H+h$ obtain all lattice point data L', C' and H' after adjustment, then convert lattice point LCH data (L', C', and H') after adjustment into RGB that has the same color space as the input image data by RGB conversion section 24, then by converting the adjusted lattice point data converted to RGB into CMY having the same color space as the output image data by the unadjusted color conversion section 25, the adjustment amount set by color adjustment section 20 is reflected in the color conversion LUT showing the conversion amount of image color conversion section 10 output to the image output section 3. In other words, the CMY data output from the unadjusted color conversion section 25 is written into color conversion LUT 11 by the LUT renewal section 26, and the image color conversion section 10 will become the conversion amount that converts the input image. In addition, since the unadjusted color conversion section 25 will take partial charge in only the conversion of color space of RGB→CMY that does not accompany color adjustment, it is referred to as the unadjusted color conversion section.

On the other hand, by the adjustment parameter composite section 22, the adjusted parameters 1, c, and h used in the setting (composite) of the adjusted LCH data (L', C', and H') that the color adjustment section 20 outputs will indicate the adjustment parameter set beforehand in the NVRAM 6, the adjustment parameter input from the user operating panel 5, and the one-touch adjustment parameter utilized in special color adjustment corresponding to specified color input from the user operating panel 5. For instance, $l=l_{NVRAM}+l_{PANEL}+l_{ONE-TOUCH}$ $c=c_{NVRAM} \times c_{PANEL}+c_{ONE-TOUCH}$, and $h=h_{NVRAM}+h_{PANEL}+h_{ONE-TOUCH}$ The subscript NVRAM indicates the adjustment amount stored in NVRAM 6, the subscript PANEL indicates the adjustment amount input from the User Operating Panel 5, and the subscript ONE-TOUCH indicates adjustment amount of the specified color tone input by the one-touch adjustment from the User Operating Panel 5, respectively.

By the conversion equation shown above, the setting can be made without further consideration.

In this way, the image processing apparatus of the present invention will give color adjustment against color coordinate data equivalent to coordinates address of color conversion LUT, and the color conversion (color conversion from RGB to CMY only) is executed with parameters which do not reflect color adjustment to the results of this color adjustment at all. By rewriting the color conversion LUT with this color conversion result, the color adjustment of the input image is made. Furthermore, in this Embodiment, the one-touch adjustment parameter considers a parameter comprising a target hue indicating what kind of color the whole image should approach, the maximum displacement amount of the hue angle that expresses how much the hue angle should be changed in order to approach the target hue angle, and the hue angle unchanging width for giving a range which will not change the hue angle in order to prevent generation of color-mismatching caused by changes in the hue angle in the specified colors.

Figures 2A, 2B:
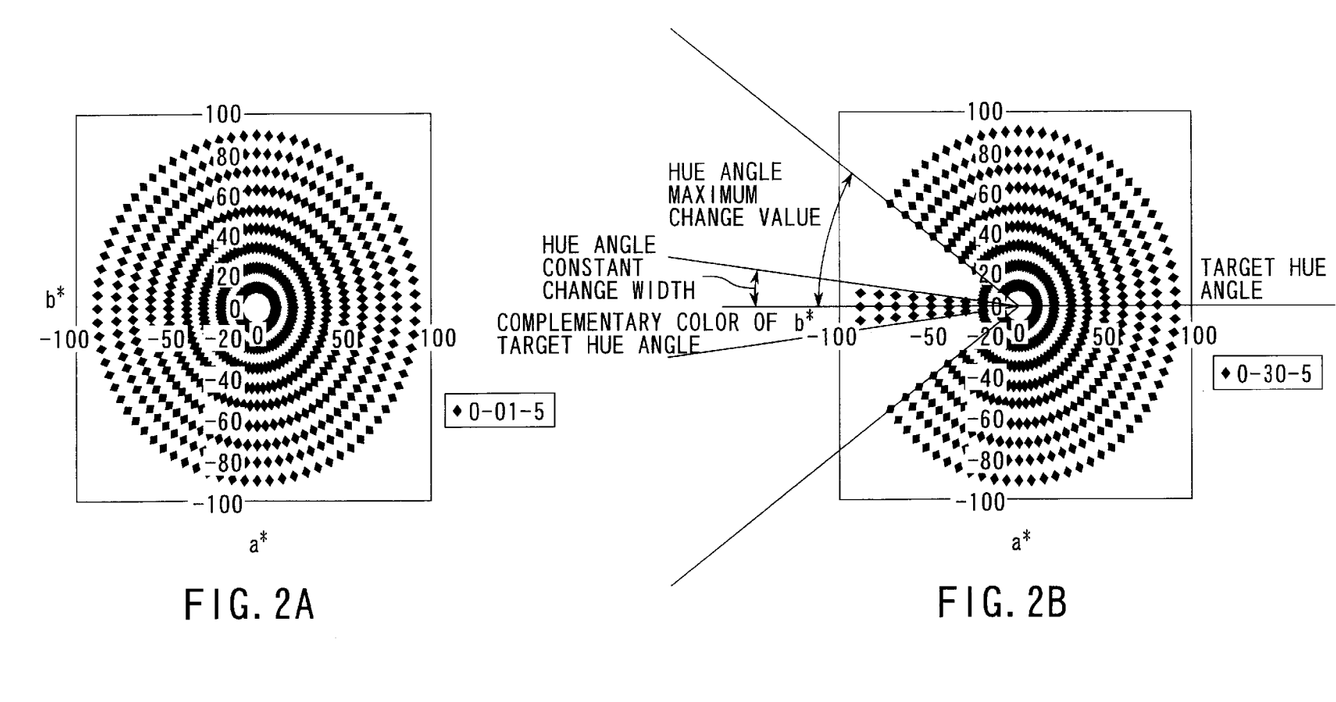
FIGS. 2A and 2B are schematic drawing explaining an example of color adjustment based on sensibility terms in First Embodiment.

FIG. 2A and FIG. 2B are schematic drawings explaining the above mentioned three respective parameters of target hue angle, the maximum displacement of the hue angle, and the unchanging width of the hue angle, which are used in the one-touch adjustment parameter generating section 23 shown in FIG. 1.

FIG. 2A shows a state in which the color distributed in L*a*b* color space are projected on a*b* plane, and the respective plots indicate the hue (H) and the chroma (C).

In the color image processing apparatus 1 shown in FIG. 1, if one-touch adjustment is input from the User Operating Panel 5, as shown below, in the color adjustment section 20, the hue (H) of each point will change by each of the following operations.

D=|Hue prior to one touch adjustment−Target Hue Angle|

When D<(180−Unchanging width of hue angle) Hue after one touch adjustment

=Target hue angle+D×(180−Max. displacement amount of hue angle)/180

When D≧(180−Unchanging width of hue angle)

Hue after one-touch adjustment=Hue prior to one-touch adjustment.

FIG. 2B shows an example for changing the one-touch adjustment parameter corresponding to the sensibility term called "warm," and it indicates the state of the a*b* plane corresponding to the adjustment results of the "Target hue angle=0°," "Hue angle maximum displacement amount= 30°," and "Hue angle unchanging width=5°."

Next, an explanation is given on the hue angle unchanging width in the above operation.

As shown in FIG. 2B, in the vicinity of the complementary color for the target hue, it is realized that the direction of change will be reversed by a slight change in the hue angle (i.e. At the b* axis separation is made into + and −).

Thus, if the coordinates of the color conversion table are distributed in the vicinity of the complementary color target hue, the distance between the coordinates which are mutually close to begin with, may separate unnaturally depending on the adjustments. As a result, there is the problem of degrading the image quality by the formation of pseudo-profile in the output image or reversing of the gradation.

In order to prevent the forming of pseudo-profile and reversing of gradation, a hue angle unchanging width which will not change the hue regarding the coordinates related to the complementary color of the target hue is given, and even in case one-touch adjustment is input by the user from the User Operating Panel 5, it is designed so that no hue changes occur in the coordinates data within the specified regions, and control is made, so that no undesirable changes occur in the hue.

In this way, the coordinates LCH data after adjustments calculated by the color adjustment section 20 is converted into the data of RGB color space similar to the input image data by the LCH/RGB conversion section 24.

Hereafter, as explained above, the adjusted coordinates data are converted into CMY color space data which are similar to the output image data by the unadjusted color conversion section 25, and they are reflected in the color conversion LUT11 shown in the conversion amount of the image color conversion section 10 that is output to image output section 3.

<<Second Embodiment>>

In the case of Second Embodiment, at the time of conducting color conversion processing, by making a three-stage structure comprising not only the basic color conversion but also difference color conversion and complementary color conversion, color conversion processing of even higher accuracy is possible. For instance, the generation of the parameters for the basic color conversion is made at the time of shipment from the factory, generation of parameters for the complementary color conversion is conducted for the absorbance of changes which occur with the elapse of time, and generation of parameters for the difference color conversion is conducted for the absorbance of individual differences in the apparatus, thereby enabling even finer color adjustments of high accuracy.

Figure 3:
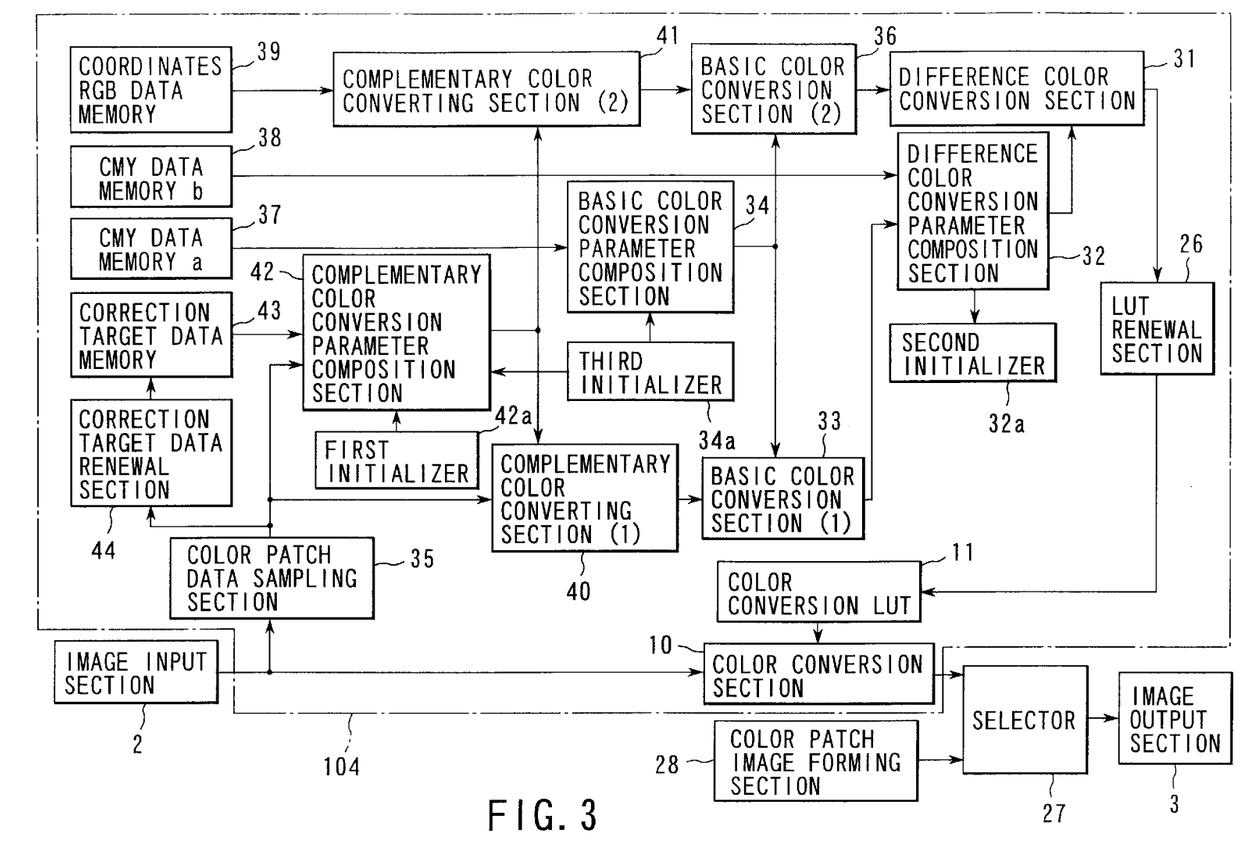
FIG. 3 is a schematic block diagram explaining the image processing apparatus of Second Embodiment related to the present invention.

FIG. 3 is a schematic block diagram showing an example of the image processing apparatus that is Second Embodiment of the present invention. In addition, in the case of similar composition as that shown in FIG. 1, the same numerical references were attached, and detailed explanations were omitted.

As shown in FIG. 3, the image processing apparatus 101 possesses the image input section 2, the image output section 3, and the image processing section 104.

The image processing section 104 comprises the image color conversion section 10, the color conversion LUT11, and the LUT renewal section 26, and it also includes the difference color conversion section 31, difference color conversion parameter generating section 34, color patch data sampling section 35, complementary color conversion section (1) 40, complementary color conversion section (2) 41, complementary color conversion parameter generating section 42, correction target data memory 43, correction target data renewal section 44, and basic color conversion section (2) 36 explained below. Furthermore, in the complementary color conversion parameter generating section 32, the second initialization section 32a is connected, and in the basic color conversion parameter composition section 34, the initialization section 33a is connected, respectively.

As shown in FIG. 3, the output of color patch data sampling section 35 is input to the correction target data renewal section 44 and the correction color conversion section (1) 40, and the respective outputs are input to the correction target data memory 43 and the basic color conversion section (1) 33.

The output of the correction target data memory 43 and the color patch data from the color patch data sampling section 35 are provided to the complementary color conversion parameter generating section 42, and the complementary color conversion parameter 42 is generated, and supplied to the complementary color conversion section (1) 40 and complementary color conversion section (2) 41.

Moreover, to the basic color conversion parameter composition section 34, the CMY data memory a 37 is connected, and to the difference color conversion parameter composition section 32, the CMY data memory b 38 is connected, and to the basic color conversion section B 36, the coordinates RGB data memory 39 is connected via the complementary color conversion section (2) 41. Furthermore, to the image output section 3, the color patch image generating section 28 is connected via the selector 27.

Next, an explanation of an example for processing in image processing apparatus 101 shown in FIG. 3 is given.

First of all, an explanation is given on the composition method of the basic color conversion parameter.

By using the color patch image composition section 28, the color patch image data corresponding to the CMY data stored in the CMY data memory a 37 are generated, and the (first) color patch image is output by the image output section 3.

Next, the color patch image that has been output is input to the image input section 2 from the unillustrated scanner, etc., then the input color patch image data are obtained.

Subsequently, the RGB data a' of each color of the color patch image is extracted from the input color patch image data by the color patch data sampling section 35, and provided to the complementary color conversion section (1) 40.

The complementary color conversion section (1) 40 conducts complementary color conversion on the color patch RGB data a' by using the complementary color conversion parameter that has been set, and supplies the color patch RGB data a which are the results to the basic color conversion parameter composition section 34.

If this is expressed in the basic color conversion parameter composition section 34 by the color patch RGB data a which are the results of the complementary color conversion, and the CMY data (the same as the data which became the basis for outputting the color patch image) stored in the CMY data memory a 37, it will be as follows:

$$\begin{bmatrix} C' \\ M' \\ Y' \end{bmatrix} = \underbrace{\begin{bmatrix} D_{00} & D_{01} & D_{02} & D_{03} & D_{04} & D_{05} & D_{06} & D_{07} & D_{08} & D_{09} \\ D_{10} & D_{11} & D_{12} & D_{13} & D_{14} & D_{15} & D_{16} & D_{17} & D_{18} & D_{19} \\ D_{20} & D_{21} & D_{22} & D_{23} & D_{24} & D_{25} & D_{26} & D_{27} & D_{28} & D_{29} \end{bmatrix}}_{\text{Basic color conversion parameter}} \begin{bmatrix} R_i \\ G_i \\ B_{i_2} \\ R_{i_2} \\ G_{i_2} \\ B_i \\ R_i G_i \\ G_i B_i \\ B_i R_i \\ 1 \end{bmatrix} \quad [1]$$

where $D_{00}$ through $D_{29}$ indicate the basic color conversion parameter.

In order to satisfy the above equation [1], basic color conversion parameters $D_{00}$ through $D_{29}$ are composed by the least square approximation method.

Furthermore, at the time of setting the basic color conversion parameter, by the first initialization section 42a, it is possible to make settings so that the complementary color conversion parameter composition section 42 is returned to the specified initial state so that the complementary color conversion is nullified. In other words, it is also possible to make the color patch RGB data a equal to the color patch RGB data a'.

The complementary color conversion mentioned above corrects the RGB signals which can be input at the present time in case difference in characteristics recognized by the changes occurring by the elapse of time between the time the basic color conversion parameter was composed and the present time, or in case differences in characteristics occur between the scanner used for the composition of the basic color conversion parameter and scanner used at present, in the unillustrated image input section (scanner), and the RGB signals which can be input at present can be converted into RGB signals which are equivalent to the RGB signals which are obtainable by input based on the scanner at the time of preparing basic color conversion parameter.

From the above, the correction target data stored in the correction target data memory 43 is successively renewed by the correction target data renewal section 44. In other words, at the time of basic color conversion parameter composition, the specified color patch manuscript undergoes image input, and the RGB data of each color of the (manuscript) color patch is extracted by the color patch data sampling section 35, and by the correction target data renewal section 434, the RGB data stored in the correction target data memory 43 is replaced with the RGB data read from the aforementioned color patch.

Next, an explanation is given on the supplementary color conversion parameter.

As mentioned above, the supplementary color conversion parameter is used for eliminating the influence of the changes in characteristics which occur with the elapse of time or the individual differences, and the color patch manuscript or the specified color patch manuscript composed by color patch image composition section 28 is image input by an unillustrated scanner, and made into input color patch data, then RGB data c (R', G', and B') of each color of the color patch is extracted from the input color patch data by the color patch sampling section 35, then supplied to the supplementary color conversion parameter composition section 42. Moreover, the color patch manuscript for the input color patch data mentioned above is composed of, for instance, full tone output (i.e. does not include intermediate color tones such as half-tone), and it is desirable that it is not affected by output systems of intermediate tone output. Furthermore, it is necessary that manuscript of certain quality is made available steadily and continuously.

The complementary color conversion parameter composition section 42 uses RGB data c and RGB data ($R_1$, $G_1$, and $B_1$) of correction target data memory, and expresses the following:

$$\begin{bmatrix} R_i \\ G_i \\ B_i \end{bmatrix} = \underbrace{\begin{bmatrix} s_{00} & s_{01} & s_{02} & s_{03} \\ s_{10} & s_{11} & s_{12} & s_{13} \\ s_{20} & s_{21} & s_{22} & s_{23} \end{bmatrix}}_{\substack{\text{Complementary color} \\ \text{conversion parameter}}} \begin{bmatrix} R' \\ G' \\ B' \\ 1 \end{bmatrix} \quad [2]$$

Provided that $S_{00}$ to $S_{03}$, $S_{10}$ to $S_{13}$ and $S_{20}$ to $S_{23}$ indicate supplementary color conversion parameters.

In order that the above relation will be satisfied, the complementary color conversion parameters $S_{00}$, $S_{01}$, $S_{02}$, $S_{03}$, $S_{10}$, $S_{11}$, $S_{12}$, $S_{13}$, $S_{20}$ $S_{21}$, $S_{22}$ and $S_{23}$ are composed. Furthermore, in this operation, restrictive conditions such as $S_{03}=S_{13}=S_{23}=0$.

Next, an explanation is given on the difference color conversion parameter composition method.

Use color patch image composition section 28 and compose color patch image data corresponding to CMY data stored in the CMY data memory b 38, and output (second) color patch image with image output section 3. Furthermore, CMY data memory b 38 may be used in common with CMY data memory a 37.

Subsequently, input from the image input section 2, the color patch image which has been output, by using unillustrated scanners or the like, and obtain the input color patch image data.

Next, extract RGB data b' of each color of the color patch image from the input color patch image by the color patch data sampling section 35, and supply to the supplementary color conversion section (1) 40.

The supplementary color conversion section (1) 40 uses the complementary color conversion parameter composed by the complementary color conversion parameter composition section 42, and conducts complementary color conversion on the input RGB data b', then supplies the color patch RGB data b that is the result, to the basic color conversion section (1) 33.

The basic color conversion section (1) 33 uses the basic color conversion parameter that has been composed previously by the basic color conversion parameter composition section 34, and converts the color patch RGB data b' to CMY data, then supplies them to the difference parameter composition section 32.

Next, by using C', M', and Y' that are the conversion results for converting the color patch RGB data b to CMY data, and the CMY data (the same data as those that were used to output the color patch image) stored in the CMY data memory b 38, and by using the least square approximation method the difference color conversion parameters $F_{00}$, $F_{01}$, $F_{02}$, $F_{03}$, $F_{10}$, $F_{11}$, $F_{12}$, $F_{13}$, $F_{20}$, $F_{21}$, $F_{22}$ and $F_{23}$, are composed so that the following equations can be satisfied.

$$\begin{bmatrix} C_i \\ M_i \\ Y_i \end{bmatrix} = \underbrace{\begin{bmatrix} F_{00} & F_{01} & F_{02} & F_{03} \\ F_{10} & F_{11} & F_{12} & F_{13} \\ F_{20} & F_{21} & F_{22} & F_{23} \end{bmatrix}}_{\text{Difference color conversion parameter}} \begin{bmatrix} C' \\ M' \\ Y' \\ 1 \end{bmatrix} \quad [3]$$

where $F_{00}$ to $F_{02}$, $F_{10}$ to $F_{12}$, and $F_{20}$ to $F_{22}$ indicate the difference color conversion parameters.

Furthermore, in this operation restrictive conditions such as $F_{03}=F_{13}=F_{23}=0$ may be added.

Next, an explanation is given on the calculation method of the values to be written into the color conversion LUT11.

First of all, coordinates RGB data equivalent to all coordinates addresses of the color conversion LUT11 stored in the coordinates RGB data memory 39 are supplied to the complementary color conversion (2) 41.

Complementary color conversion section (2) 41 uses the complementary conversion parameter composed with the complementary color conversion parameter composition section 42, and similar top complementary color conversion (1) 40, converts the coordinates RGB data to complementary RGB data.

Next, by the basic color conversion section (2) 36, the complementary RGB data composed with the complementary color conversion section (2) 41 are converted into coordinates C', M' and Y' data by the basic color conversion parameter composed previously. Furthermore, since the processing at the basic color conversion section (2) 36 is substantially the same as the processing conducted by basic color conversion section (1) 33 explained previously, detailed explanation is omitted.

Subsequently, by the difference color conversion section 31, based on the difference color conversion parameter composed previously, the coordinates C', M' and Y' data supplied from the basic color conversion section (2) are converted to coordinates C, M, and Y data.

The coordinates C, M, and Y data obtained in this manner are written into color conversion LUT11 by the LUT conversion section 26.

Hereafter, the image data input by the image input section 2 undergoes color conversion based on the renewed data written into color conversion LUT11 with the image color conversion section 10, then output to the image output section 3.

By the above procedure, the color conversion of the output image output from the unillustrated image formation apparatus is done under a state in which the high accuracy conversion based on basic parameters, and the conversion based on the complementary and difference parameters that absorb the changes caused by the elapse in time and the difference of the individuals, are separated. In relation to the basic parameters, they are set only once, and substantially no changes are made, and as for the conditions of changes caused by the elapse of time and individual differences, by merely setting the complementary parameters or difference parameters with a simple method, output becomes possible while maintaining the state of high accuracy color conversion characteristics as a whole.

<<Third Embodiment>>

Figure 4:
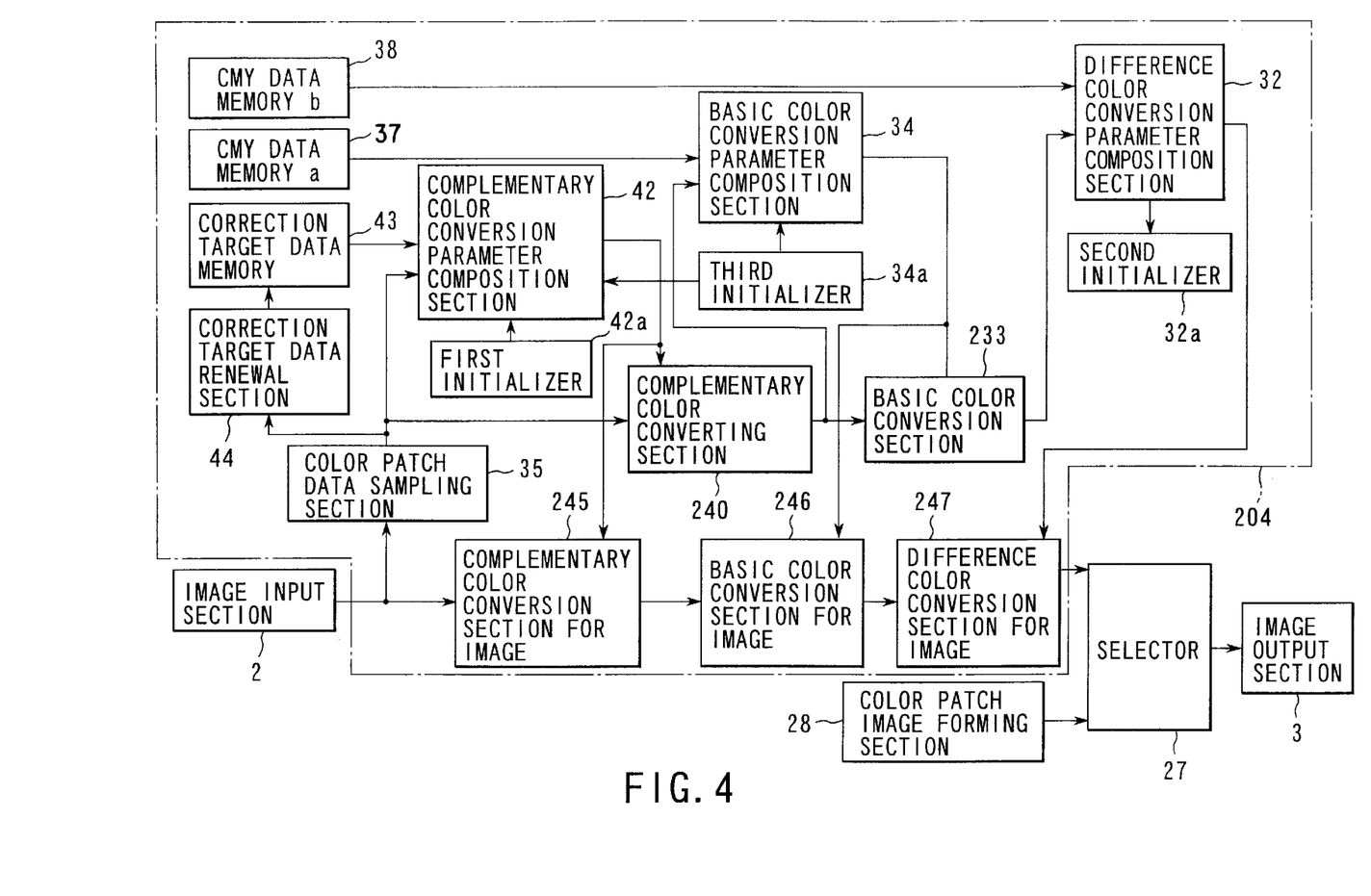
FIG. 4 is a schematic block diagram explaining the image processing apparatus of Third Embodiment related to the present invention.

Similar to Second Embodiment, at the time color adjustment and color conversion processing are conducted for Third Embodiment, a three stage composition comprising basic color conversion, difference color conversion, and complementary color conversion are taken. However, in the case of Second Embodiment, color conversion LUT was installed, and conversion was realized by changing these parameters. In the case of Third Embodiment, an even higher accuracy color adjustment and color conversion are realized without using color conversion LUT. FIG. 4 is a schematic block diagram showing an example of the image processing apparatus of Third Embodiment related to the present invention. Furthermore, in the case of compositions having the same composition as those of FIG. 1 and FIGS. 2A and 2B, the same numerical references were attached, and the detailed explanations are omitted.

As shown in FIG. 4, the image processing apparatus 201 comprises image input section 2, image output section 3 and image processing section 204.

The image processing section 204 is roughly similar to the image processing apparatus 101 shown in FIG. 3, and comprises difference color conversion parameter composition section 32, basic color conversion section 233, basic color conversion parameter composition section 34, color patch data sampling section 35, complementary color conversion section 240, complementary color conversion parameter composition section 42, correction target data memory 43, correction target data renewal section 44, complementary color conversion section for images 245, basic color conversion section for images 246, and difference color conversion section for images 247. Furthermore, to the complementary color conversion parameter composition section 42, the first initialization section 42*a* is connected, to the color difference color conversion parameter composition section 32, the second initialization section 32*a* is connected, and to the basic color conversion parameter composition section 34, the third initialization section 34*a* is connected. In addition, CMY data memory a 37 and CMY data memory b 38 are connected to basic color conversion parameter composition section 34 and difference color conversion parameter composition section 32, respectively. Furthermore, to the image output section 3, the color patch image composition 28 is connected via the selector 27.

Next, an explanation is given on an example of processing in image processing apparatus 201 shown in FIG. 4.

By using color patch image composition section 28, compose the color patch image data corresponding to the CMY data stored in the CMY data memory b 38, and output the color patch image with the image output section 3.

Subsequently, by the unillustrated scanner and the like, input the output color patch image from the image input section 2, and obtain the input color patch image data.

Next, by the color patch data sampling section 35, extract the RGB data a' of each color of the color patch image from the input color patch image data, then supply them to the complementary color conversion section 240.

The complementary color conversion section 240 uses the complementary color conversion parameter that has been set, and conducts complementary color conversion on the color patch RGB data a', and the color patch RGB data a which is the result thereof, is supplied to the basic color conversion parameter composition section 34.

Hereafter, by the color patch RGB data a that are the results of the complementary conversion, and the CMY data (The same data as those used for outputting color patch images) stored in the CMY data memory a 37, in the basic color conversion parameter composition section 34, the basic color conversion parameter $D_{00}$ through $D_{29}$ are composed by equation [1] already explained in FIG. 3.

Furthermore, at the time of setting the basic color conversion parameter, it is also possible to make settings so that the complementary color conversion parameter composition section 4 is returned to the specified initialization state and nullified by the first initialization section 42a.

In the above mentioned complementary color conversion, the correction target data stored in the correction target data memory 43, are successively renewed by the correction target data renewal section 44 at the time of basic color conversion parameter composition.

Next, an explanation is given on the complementary color conversion parameter.

As mentioned above, the complementary color conversion parameter is used in order to eliminate the influence of changes that occur with the elapse of time in the characteristics of the scanner (input section) or the individual differences, and image input is conducted on the color patch manuscript composed by the color patch image composition section 28 or the specified color patch manuscript by the unillustrated scanner, thereby forming input color patch data. Subsequently, the RGB data c (R', G', and B') of each color of the color patch are extracted from the input color patch data, and supplied to the complementary color conversion parameter composition 42.

The complementary color conversion parameter composition section 42 uses RGB data c and RGB data ($R_1$, $G_1$, and $B_1$) correction target data memory, and by a similar method explained in equation [2] in FIG. 3, the complementary color conversion parameters $S_{00}$, $S_{01}$, $S_{02}$, $S_{03}$, $S_{10}$, $S_{11}$, $S_{12}$, $S_{13}$, $S_{20}$, $S_{21}$, $S_{22}$ and $S_{23}$ are composed. In addition, in this operation, restrictive conditions such as $S_{03}=S_{13}=S_{23}=0$ may be added.

Next, an explanation is given on the composition method of difference color conversion parameter.

Use a color patch image composition 28 and compose color patch image data corresponding to CMY data stored in CMY data memory b 38, and output (second) color patch image at image output section 3. Furthermore, the CMY data memory b 38, may be shared with CMY data memory a 37.

Subsequently, the color patch image that has been output is input from an image input (second) by unillustrated scanner and the like, and the input color patch image data are obtained.

Next, by the color patch data sampling section 35, the RGB data b' of each color of the color patch image are extracted from input color patch image data, and supplied to complementary color conversion section 240.

Complementary color conversion section 240 uses complementary color conversion parameter composed by complementary color conversion parameter composition section 42 and conducts complementary color conversion on RGB data b' that has been input, and the color patch RGB data b which is the result is supplied to the basic color conversion section 233.

The basic color conversion section 233 uses the basic color conversion parameter composed previously by basic color conversion parameter composition section 34, and the color patch RGB data b is converted to the CMY data, then supplied to the difference parameter composition section 32.

Next, by using C', M' and Y' which are the conversion results of converting the color patch RGB data b to CMY data and the CMY data (The same data used for outputting the color patch image) stored in the CMY data memory b 38, in the difference color conversion parameter composition section 32, by equation [3] explained by using FIG. 3, the difference color conversion parameters $F_{00}$, $F_{01}$, $F_{02}$, $F_{03}$, $F_{10}$, $F_{11}$, $F_{12}$, $F_{13}$, $F_{20}$, $F_{21}$, $F_{22}$ and $F_{23}$, are composed. Furthermore, in this operation restrictive conditions such as $F_{03}=F_{13}=F_{23}=0$ may be added.

In this way, in case the basic color conversion parameter, complementary color conversion parameter, and the difference color conversion parameter are set, the RGB image data input from the unillustrated image input section (scanner) undergo color conversion to first intermediate image data (Correction RGB image data) expressed by RGB color space by using equation [2] and the complementary conversion parameter.

Subsequently, the first intermediate image data (correction RGB image data) use equation [1] and basic color conversion parameter by basic color conversion section for image 246, and converted into the second intermediate image data (C' M' Y' image data).

Next, the second intermediate image data (C'M'Y' image data) use equation [3] and difference color conversion parameter by difference color conversion section for image 247, and converted into CMY image data, then output to image output section 3.

By the above operation, the output image output from the unillustrated image forming apparatus will be in a state in which the color conversion is separated into high accuracy conversion based on the basic parameter, complementary parameters absorbing the changes occurring by elapse of time and the individual differences, and conversions based on difference parameters. In the case of the basic parameters, they are set only once and substantially no changes are made, and in the cases of the conditions corresponding to the changes occurring with the elapse of time and individual differences, by setting only the complementary parameters or difference parameters with simple methods, output becomes possible in a state in which high accuracy of color conversion characteristics are maintained as a whole.

<<Conclusion>>

As explained above, in the image processing apparatus related to the First Embodiment of the present invention, since the contents of the color conversion LUT reflects the results of the color adjustments, unlike the conventional methods, color conversion processing need not be repeated several times at the time color adjustments are made, thereby enabling the apparatus to conduct color adjustments without increasing the processing time demanded by the image processing.

Furthermore, since it is possible to change the color adjustment parameters for each coordinates of the color conversion LUT, a color adjustment having higher freedom can be realized without causing increase in the processing time.

In addition, in the color adjustment, adjustments are made by using data oriented towards color conversion original color space (scanner color space) which has a clear relation with the calorimetric color space that are color coordinates data equivalent to the coordinates address of the color conversion LUT. Therefore, in comparison with the known methods of adjustments where data oriented towards the printer coloring material color space of which the relation with the calorimetric color space easily changes is used, a color adjustment that is stable and easily obtains the desired results becomes possible.

Furthermore, in the case of color tone adjustments indicated by sensibility terms, by allowing one term correspond to a plurality of adjustment parameters, it becomes possible to input operation data easily from the control panel.

Furthermore, in the Second and Third Embodiments of the present invention, the color conversion process was made to consist of three independent stages, namely, basic color conversion, difference color conversion, and complementary color conversion. By doing so, even by only the basic color conversion, high accuracy color conversion can be made by the higher order polynomial approximation, and by the difference color conversion which functions as fine adjustment, an even higher accuracy color conversion can be achieved. In addition, by making the composition of the basic color conversion parameter at the time of factory shipment, it is possible to conduct the complementary color conversion parameter and difference color conversion parameter after the operation with the purpose of absorbing the changes occurring with the elapse of time as well as absorbing the individual differences of the apparatuses, and color conversion parameters can be set by a method corresponding to the situation. This means that the basic color conversion parameter is composed at the time of assembling the apparatus, and by making it possible to compose the difference color conversion parameter after operation, with the purpose of absorbing the individual differences of the apparatuses and the changes that occur with the elapse of time, the setting of color conversion parameters that correspond to the operating conditions can be made, and stable color adjustments become possible over a long period of time.

Furthermore, in each of the basic color conversion, complementary color conversion, and difference color conversion, since the color composition of the color patch image can be changed, only at the time of complementary color conversion and difference color conversion, it is possible to make use of patch images with small number of colors which is suitable for field operation because of easy handling.

In addition, independently obtain the basic color conversion parameter, the complementary color conversion parameter and the difference color conversion parameter. Later on reflect the characteristics expressed by the respective color conversion parameters on a single color conversion LUT.

By doing so, in the image processing, the color conversion of the LUT system will become one stage. The processing speed is for one stage only, and a high accuracy color conversion can be achieved. Thus, the scale of the hardware can be suppressed to the amount for one stage, and the apparatus cost can be reduced.

Moreover, since the difference color conversion can be nullified by the initialization, for instance, immediately after setting the basic color conversion parameter, in case the levels of the complementary color conversion parameter and the difference color conversion parameters are such that they would not be required, it is possible to omit the setting work of the difference color conversion parameters.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image processing apparatus which executes color conversion processing on an input image data expressed in first color space, and outputs an output image data expressed in second color space, comprising:

LUT means for storing color conversion LUT data that is referred to at the time of color conversion processing;

storing means for storing a first lattice point color coordinates data equivalent to lattice point address of the color conversion LUT data;

color tone instruction means for inputting instruction information instructing color tone changes that have been set beforehand in accordance with a specified conditions;

color adjustment parameter composition means for composing color adjustment parameters in accordance with the instruction information input from the color tone instruction means;

color adjusting means for color adjusting the first lattice point color coordinates data stored in the storage means with the color adjustment parameter composed by the color adjustment parameters composition means, so as to output a second lattice point color coordinates data;

unadjusted color conversion means for converting the second lattice point color coordinates data output from the color adjustment means into the second lattice point color coordinates data expressed in the second color space;

color conversion LUT renewal means for renewing the color conversion LUT data stored by the LUT means in accordance with the second lattice point color coordinates data converted by the unadjusted color conversion means; and color conversion means for converting the input image data expressed in the first color space to the output image data expressed in the second color space in accordance with the color conversion LUT data renewed by the color conversion LUT renewal means.

2. A color image processing apparatus according to claim 1, wherein the color adjustment parameter composition means includes:

means for composing a target hue angle, a hue angle maximum displacement amount, and a hue angle unchanged width as the color adjustment parameters based on the instruction information input from the color tone instruction means.

3. A color image processing apparatus according to claim 2, wherein the color adjusting means includes:

means for approaching the target hue angle based on the target hue angle supplied by the color adjustment parameter composition means by adjusting the displacement amount in accordance with the difference between the hue angle of the first lattice point color coordinates data and the target hue angle.

4. A color image processing apparatus according to claim 2, wherein the color adjusting means includes:

means for setting the displacement amount of hue which is infinitely close to the complementary color of the target hue angle almost the same as the hue angle maximum displacement amount by making the hue angle of the first lattice point color coordination data closer to the target hue angle by the displacement amount which is in accordance with the difference between the said angle and the target hue angle based on the target hue angle supplied from the color adjustment parameter composition means.

5. A color image processing apparatus according to claim 2, wherein the color adjusting means includes:

means for setting the hue angle unchanged for the region which is in the range corresponding to the hue angle unchanged width centered around the complementary color of the target hue angle, by making the hue angle of the first lattice point color coordinates data closer to the target hue angle by the displacement amount corresponding to the difference between the hue angle and the target hue angle based on the target hue angle supplied from the color adjustment parameter composition means.

6. A color image processing apparatus which conducts color conversion processing on an input image data expressed in the first color space and outputs an output image data expressed in the second color space:

LUT means for storing color conversion LUT data referred to at the time color conversion processing;

storage means for storing first lattice point color coordinates data equivalent to lattice point address of the LUT data;

correction target data storage means for storing first color data group that is the correction target;

color data extraction means for extracting second color data group of a plurality of color coding from the input image data expressed in the first color space;

complementary color conversion parameter composition means for composing the complementary color conversion parameter based on the first color data group supplied from the complementary target data storage means and the second color data group supplied by the color data extraction means;

basic color conversion target data storage means for storing third color data group that is the basic color conversion target data;

first complementary color conversion means for conducting complementary color conversion on the first lattice point color coordinates data stored in the storage means with the complementary color parameter composed by the complementary color conversion parameter composition means, so as to output the second lattice point color coordinates data expressed in the first color space;

second complementary color conversion means for conducting complementary color conversion on the second color data with the complementary color conversion parameter composed by the complementary color conversion parameter composition means, so as to output fourth color data group expressed in the first color space;

basic color conversion parameter composition means for composing the basic color conversion parameter based on the third color group supplied from the basic color conversion target data storage means and the fourth color group supplied from the second complementary color conversion means;

basic color conversion means for conducting basic color conversion on the second lattice point color coordinates data supplied from the first complementary color conversion means corresponding to the basic color conversion parameter composed by the basic composition means, so as to output a third lattice point color coordinates data expressed in the second color space;

color conversion LUT renewal means for renewing the color conversion LUT data corresponding to the third lattice point color coordinates data; and image color conversion means for converting the input image data expressed in the first color space into the output image data expressed in the second color space based on the color conversion LUT data renewed by the color conversion LUT renewal means.

7. A color image processing apparatus according to claim 6, wherein the correction target data storage means includes:

correction target data renewal means for renewing the first color data group stored in the correction target data storage means.

8. A color image processing apparatus according to claim 6, wherein the complementary color conversion parameter composition means includes:

initialization means for initializing the complementary color conversion parameter with predetermined values.

9. A color image processing apparatus according to claim 6, wherein the basic color conversion parameter composition means includes:

complementary color conversion parameter clearing means for clearing the complementary color conversion parameter when the basic color conversion parameter is composed.

10. A color image processing apparatus according to claim 6, wherein the basic color conversion parameter composition means includes:

correction target renewal means for writing at least a part of the first color data group extracted by the color data extraction means, into the correction target data storage means when the basic color conversion parameter is composed.

11. A color image processing apparatus comprising:

color data extraction means for extracting the first color group of a plurality of coloring codes from an input image data expressed in the first color space;

correction target data storage means for storing the second color data group that is a correction target data;

complementary color conversion parameter composition means for composing a complementary color conversion parameter corresponding to the first color group supplied from the color data extraction means and the second color data group supplied from the correction target data storage means;

basic color conversion target data storage means for storing the third color data group that is a basic color conversion target data;

first complementary color conversion means for conducting complementary color conversion on the input image data with the complementary parameter composed by the complementary color conversion parameter composition means, so as to output correction image data expressed in the first color space;

second complementary color conversion means for conducting complementary color conversion on the input image data with the complementary color conversion parameter composed by the complementary color conversion parameter composition means, so as to output a fourth image data group expressed in the first color space;

basic color conversion parameter composition means for composing a basic color conversion parameter corresponding to the third color data group supplied from the basic color conversion target data storage means and the fourth color data group supplied from the second complementary color conversion means; and basic color conversion means for conducting basic color conversion on the correction image data supplied from the first complementary color conversion means with the basic color conversion parameter composed by the basic color conversion parameter composition means, so as to output the output image data expressed in the second color space.

12. A color image processing apparatus according to claim 11, wherein the correction target data storage means includes:

correction target data renewal means for renewing the first color data group stored in the correction target data storage means.

13. A color image processing apparatus according to claim 11, wherein the complementary color conversion parameter composition means includes:

initialization means for initializing the complementary color conversion parameter with a predetermined values.

14. A color image processing apparatus according to claim 11, wherein the basic color conversion parameter composition means includes:

complementary color conversion parameter clearing means for clearing the complementary color conversion parameter when the basic color conversion parameter is composed.

15. A color image processing apparatus according to claim 11, wherein the basic color conversion parameter composition means includes:

correction target data renewal means for writing at least a part of the first color data group extracted by the color data extraction means, into the complementary target data storage means, when the basic color conversion parameter is composed.

* * * * *